United States Patent
Lindoff et al.

(10) Patent No.: US 9,232,418 B2
(45) Date of Patent: Jan. 5, 2016

(54) METHODS AND DEVICES FOR RADIO LINK MONITORING

(75) Inventors: Bengt Lindoff, Bjärred (SE); Walter Müller, Upplands Väsby (SE); Mats Sågfors, Kyrkslätt (FI)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 179 days.

(21) Appl. No.: 14/110,307

(22) PCT Filed: Feb. 17, 2012

(86) PCT No.: PCT/EP2012/052770
§ 371 (c)(1),
(2), (4) Date: Dec. 11, 2013

(87) PCT Pub. No.: WO2012/139798
PCT Pub. Date: Oct. 18, 2012

(65) Prior Publication Data
US 2014/0112155 A1    Apr. 24, 2014

Related U.S. Application Data

(60) Provisional application No. 61/475,700, filed on Apr. 15, 2011.

(51) Int. Cl.
| | |
|---|---|
| H04J 1/16 | (2006.01) |
| H04W 24/04 | (2009.01) |
| H04W 24/08 | (2009.01) |
| H04W 88/06 | (2009.01) |
| H04W 24/10 | (2009.01) |
| H04W 24/00 | (2009.01) |
| H04W 48/16 | (2009.01) |

(52) U.S. Cl.
CPC ............ *H04W 24/04* (2013.01); *H04W 24/08* (2013.01); *H04W 24/10* (2013.01); *H04W 88/06* (2013.01); *H04W 24/00* (2013.01); *H04W 48/16* (2013.01)

(58) Field of Classification Search
CPC ..... H04W 24/00; H04W 24/04; H04W 24/06; H04W 24/08; H04W 24/10; H04W 24/16; H04W 88/06

USPC .................. 370/241–252, 329–342
See application file for complete search history.

(56) References Cited

U.S. PATENT DOCUMENTS

| | | | |
|---|---|---|---|
| 2009/0257353 A1* | 10/2009 | Song et al. | 370/241 |
| 2012/0039167 A1* | 2/2012 | Swaminathan et al. | 370/225 |

(Continued)

FOREIGN PATENT DOCUMENTS

| | | |
|---|---|---|
| WO | 2010088329 A1 | 8/2010 |
| WO | 2010105148 A1 | 9/2010 |
| WO | 2010144601 A1 | 12/2010 |

OTHER PUBLICATIONS

Nokia Siemens Networks, et al., "Aggregating HSDPA and LTE carriers", 3GPP TSG-RAN WG1 Meeting #64, Tiapei, Taiwan, Feb. 17, 2011, pp. 1-3, R1-111060, 3GPP.

(Continued)

*Primary Examiner* — Kan Yuen
(74) *Attorney, Agent, or Firm* — Coats & Bennett, PLLC

(57) ABSTRACT

The invention relates to a method for radio-link monitoring in a user equipment (4) of a communication network (1). The user equipment (4) receives and/or sends on a first carrier using a primary radio access technology system (2) and on a second carrier using a secondary radio access technology system (3). The method comprises: receiving (100), from a network node (5), information about the primary radio access technology system (2) and the secondary radio access technology system (3), and determining (110), in dependence on information related to the primary radio access technology system (2) and the secondary radio access technology system (3), whether to monitor radio link criteria on: the first carrier on the primary radio access technology system (2), or both the first carrier on the radio access technology system (2) and the second carrier on the secondary radio access technology system (3). The invention also relates to a user equipment implementing the method.

19 Claims, 4 Drawing Sheets

(56) References Cited

U.S. PATENT DOCUMENTS

2012/0093073 A1* 4/2012 Lunttila et al. ............... 370/328
2012/0140743 A1* 6/2012 Pelletier et al. ............... 370/335
2012/0178448 A1* 7/2012 Yuk et al. .................. 455/435.1

OTHER PUBLICATIONS

Nokia Coporation, et al., "Radio Ling failure open issues", 3GPP TSG-RAN WG2 Meeting #68bis, San Francisco, US, Feb. 22, 2010, pp. 1-4, R2-101283, 3GPP.

* cited by examiner

METHODS AND DEVICES FOR RADIO LINK MONITORING

TECHNICAL FIELD

The technology disclosed herein relates generally to the field of wireless communication systems, and in particular to radio link monitoring within wireless communication systems that are using multiple radio access technologies simultaneously.

BACKGROUND

Today, there are many radio and cellular access technologies and standards such as GSM/GPRS (Global system for mobile communications/General Packet Radio Service), WCDMA/HSPA (Wideband Code Division Multiple Access/High Speed Packet Access), CDMA (Code Division Multiple Access)-based technologies, WiFi (Wireless Fidelity), WiMAX (Worldwide Interoperability for Microwave Access) and recently LTE (Long Term Evolution), to name a few. The technologies and standards have been developed during the last few decades, and it can be expected that the development will continue. Specifications are developed in organizations like 3GPP, 3GPP2 and IEEE. 3GPP is responsible for the development and maintenance of GSM/GPRS, WCDMA/HSPA and LTE standards.

Various frequency bands are typically allocated and/or sold by government organizations, such that an operator may "own" certain bands for a particular use (i.e. the right to use the band in a certain way). Regulations may specify that the owner, i.e. the operator, should deploy a particular technology in a particular frequency band. In some cases, the operator may be able to choose what technology and standard to deploy in their spectrum provided that the choices fulfill certain criteria set up by e.g. the ITU (International Telecommunications Union).

As a consequence of the fact that spectrum is a scarce resource, an operator may have the rights to deploy a new cellular access, such as LTE, in a limited spectrum of, say 20 MHz.

However, the fact that the operator may have an existing customer base with existing terminals will prevent the operator from deploying only one technology in the whole spectrum owned by the operator. This could be the case e.g. for an operator that has a large customer base with WCDMA/HSPA subscriptions using the Universal Terrestrial Radio Access Network (UTRAN), and the operator wants to deploy the most recent evolution, the Long Term Evolution (LTE) of UTRAN, also called evolved UTRAN or E-UTRAN.

In this example, the operator may then have to divide the available bands between HSPA and LTE. At initial deployment of LTE, the operator may thus continue to use e.g. 10 MHz (corresponding to two WCDMA carriers) with HSPA and reserve 10 MHz for initial LTE deployment.

However, such partitioning of the scarce spectrum to different technologies has some undesired effects on performance:

There is a direct correlation between the peak-rate that can be offered and the spectrum width that is used. Thus, limiting the bandwidth of both HSPA and LTE to 10 MHz in the example above will roughly limit the peak-rate offered to customers to a half. Thus, assuming now, for the sake of illustration, that the technologies can offer around 100 Mbps in 20 MHz, it will mean that the peak-rate will now be limited to around 50 Mbps in each of the technologies.

Initially, it may happen that the HSPA carriers are very loaded, while the LTE carriers in the example only have a few users. Thus, there would be an imbalance between allocation and usage resulting in undesired congestion on the HSPA carriers. However, in order to offer a decent bit-rate on the LTE carriers, it is still not possible to allocate e.g. only 5 MHz to LTE customers, since then the LTE evolution would not provide competitive performance in relation to HSPA.

There have been discussions to find a solution for simultaneous use of multiple radio access technologies. Carrier aggregation (CA), wherein a combination or aggregation of two independent carriers is made, is one way of achieving increased resource utilization and spectrum efficiency. For example, in LTE+HSPA carrier aggregation each carrier may be an LTE carrier or a HSPA carrier. Higher peak rates and load balancing can be offered in heterogeneous deployments including at least two radio-access technologies. Both LTE carrier aggregation as well as HSPA carrier aggregation, i.e. carrier aggregation within the same Radio Access Technology (RAT), is defined in the 3GPP specifications. Dual-carrier HSPA was specified in the Release 8 standard, and LTE carrier aggregation was specified in the Release 10 standard of the 3GPP specification.

A terminal or user equipment (UE) needs to monitor the radio link or links to/from the network (NW) node, such as a base station or NodeB/eNodeB in order to detect problems with the connection or the connectivity. Depending on the system/RAT used different actions are needed in response to e.g. Radio Link Failure (RLF).

Some details of radio link monitoring in WCDMA/HSPA are described in 3GPP TS 25.331, e.g. Clause 8.5.6, and are only briefly described here for reference. In WCDMA/HSPA, using closed loop power control, the uplink (UL) power (from UE to network node) is controlled by the network node and information to increase/decrease power is sent to the UE via transmit power commands (TPC). The TPC do not have any error correction coding, hence the UE interprets the TPC and increases or decreases its transmitted power based on detected TPC. This is made 1500 times per second, i.e. power variations of 1500 dB/second are possible (although limited to a certain range of −50 to 24 dBm). The UE transmission power will have a large impact on the UL performance in neighbor cells within the proximity of the UE, causing additional interference in the neighbor cells. This is particularly true in case of an unreliable downlink (DL), in which case unreliable decoding of the TPC commands could result in that the UE is transmitting with a power that is unsuitable for the current conditions. Therefore, the UE needs to monitor reliability of the TPC commands and in case of unreliable TPC commands on the DL channels, the UE turns off its transmitter in order to not generate interference in the uplink channels. This also holds for the dual-cell HSPA case, when multiple UL carriers or channels are configured. The specifications describe various timers during which physical layer problems are detected and during which a recovery may be observed without resorting to further actions in the UE. If the layer 1 error conditions prevail, the UE will need to release the existing radio link(s).

In LTE however, the network is in control of how the UL resources on the shared UL channel or channels are allocated to each UE, and the TPC transmitted to the UE for UL power control are decoded for error detection. Hence an unreliable DL in LTE will not introduce significant UL interference, but in case the decoding of the commands sent from the network on the DL is unreliable, and if the DL is a primary downlink channel, the UE should anyway disable its UL transmission.

It is also important that the UE can select another cell, in case it cannot reliably decode any transmissions from the cell to which it is currently connected. If the UE would not select another cell, it could happen that the UE would remain in a situation where transmission and signaling is impossible. That is, the UE would remain connected to a cell which it cannot reach and/or the network cannot reach the UE via that cell. 3GPP TS 36.331 Clause 5.3.11 describes in some further detail how a failing link is detected, and what actions the UE should undertake if the conditions prevail.

In case of multi-carrier LTE, however, with multiple UL carriers configured and activated, the UE does not need to deactivate secondary (component/addition) UL carriers (of Secondary Cells, SCells). This is because the network node (such as a base station or eNodeB (eNB)) is in full control of the UE as long as the primary carrier (of Primary Cell, PCell) is ok. That is, the UE can be reached and the UE can reach the network as long as at least one DL/UL carrier pair is useful for communication with the network. In 3GPP Rel-10, it was therefore decided that the UE can refrain from any autonomous actions related to recovery from a radio link failures, as long as the PCell and the corresponding UL carrier used for e.g. random access is found to be acceptable by the UE.

For Time Division Duplex (TDD), the UE receives timing information from DL. This timing information is used for the transmission timing of the UL transmission, and it is noted that it is essential for the UE to be able to keep UL transmission timing within guard periods. The loss of the reference downlink should therefore cause the UE to not transmit on the UL on the carrier, as it could result in severe interference in neighboring subframes. Otherwise, this means that a loss of timing could, in TDD, result in that a UE would partly transmit in a subframe intended for downlink reception, resulting in severe interference to other UEs nearby that are prepared to receive a downlink transmission in such a subframe.

The timers and counters related to radio link monitoring and radio link failure (RLF) in EUTRAN (LTE) are here listed for reference (see TS 36.331, v10.0.0):

Detection of physical layer problems in RRC_CONNECTED

Upon receiving N310 consecutive "out-of-sync" indications for the PCell from lower layers the UE starts timer T310; Upon receiving N311 consecutive "in-sync" indications for the PCell from lower layers while T310 is running, the UE shall stop timer T310;

Upon T310 expiry initiate the connection re-establishment procedure;

It is noted that physical layer monitoring and related autonomous actions do not apply to SCells.

There are also specific timers for

T301 start: Transmission RRCConnectionReestablishmentRequest, T301 stop: response. Upon T301 expiry: UE enter RRC Idle of at NW T304 start: Reception of RRCConnectionReconfiguration message including the MobilityControl Info, T304 stop: at handover successfully completed, Upon T304 expiry: UE enter RRC Idle T311 start: Upon initiating the RRC connection re-establishment procedure stop: selection of suitable cell, Upon T311 expiry: UE enter RRC Idle Although prior art method and apparatus exist for radio link monitoring in case of a particular RAT, there is no such method and apparatus describing how and when the terminal/UE should monitor radio links if several RATs are used in the communication between the network node and the terminals.

Hence there is a need for such methods describing how radio links should be monitored and corresponding actions when multiple RATs used.

SUMMARY

A few words on the used terminology used throughout the description may be in order here. A "carrier" typically refers to the physical resource in a spectrum, such as e.g. a 5 MHz carrier in, say, 1900-1905 MHz. A "cell" typically refers to a logical network object that implements a cell in a physical region, where the downlink of a cell may be implemented on a particular carrier. Often, the network transmits an identity of the cell on a control channel defined for that purpose. For example, a cell A may be implemented on the aforementioned 5 MHz downlink carrier. In the physical proximity of cell A, there may be other, neighbor cells on the same or on different carriers—say Cells B and C. Cells may also be overlapping, which often occurs if they are defined on different carriers. In that case, carrier aggregation or dual/multi cell transmission/reception can be implemented, in which case a UE is configured to receive information on two/multiple carriers, where the both/multiple carriers may be separate cells, i.e. separate logical network objects. Thus, as can be seen, the terminology "carrier" and "cell" can often be interchanged in this context. In case aggregation is performed where not all aggregated physical spectrum resources are defined as cells, then multi-cell transmission/reception is not an appropriate wording. Still, carrier aggregation is appropriate, since the physical resources may be aggregated, e.g. several carriers within the same cell. For clarity, we here assume that the words multi-cell transmission/reception and carrier aggregation are interchangeable, to avoid using both terms throughout. It is further noted that various channels, such as physical, transport, and logical channels are typically configured between the UE and the network in order to enable transmission and reception on the downlink and uplink carriers in question. These channels and related methods typically follow various methods that are characteristic to the particular RAT that is used on that particular carrier, or in that particular cell. The channels typically comprise both control and traffic channels, to enable exchange of both control and traffic information between the UE and network. A UE is "configured" with a carrier or "configured" in/on a cell, in case there are channels configured between the UE and the network such that the UE is prepared to receive and/or send control information or data information using the aforementioned channels on a carrier or in a cell. Thus, multi-carrier or multi-cell configuration implies that the UE is configured with such channels on at least two carriers/cells. Such aggregation can be performed either in the downlink or uplink, or both.

One important aspect of cellular systems is connection synchronization and control. For example, the network should know whether the UE can be reached in the downlink, i.e. if there is a functioning radio-link or channel by which the network can signal messages or send data to the UE. Thus, the network obviously needs to know the synchronization status for connected terminals, i.e. whether it is in-sync or out-of-sync with the network node. This radio link monitoring is typically done by the UE e.g. by measuring the received signal quality.

However, the present and most up-to-date status or quality of a radio link (or channel) between a UE and the network is typically best known in the UE. Thus, and in some cases, the UE needs to e.g. report to the network about a failing link, or to recover a connection in case certain events or criteria related to the radio link quality are fulfilled.

Current cellular technologies, such as WCDMA/HSPA and LTE, implement solutions for radio link monitoring, as will be described in further detail below. As will be seen, the solutions for RL monitoring are rather different in the two technologies. These technologies are given purely as examples, and corresponding or other differences between other technologies may be identified.

Now, with a system with carrier aggregation of both WCDMA/HSPA and LTE at the same time, a possible solution is that the UE maintains a single connection (typically denoted Radio Resource Control (RRC) Connection) to the radio network using multiple radio links/channels/carriers that are implemented rather differently. An alternative solution is that the UE maintains multiple RRC connections—one to both systems. In any case, the UE will need to monitor the quality of the radio links on both radio access technologies or systems. In fact, the UE may have to monitor multiple radio links/carriers/channels on each of the radio access technologies.

A brief list of known methods for a UE to detect a failing radio link is given in following:

On layer 1 (physical layer): Quality on common mandatory transmission from eNB is too bad for too long time. Typically, this monitoring is performed on some cell-specific pilot channel or reference symbols, but also UE specific channels or reference symbols could be used.

On layer 2 (L2): maximum number of RLC retransmission reached, For example, the RLC protocol in HSPA implements a counter that may lead to recovery actions in case the number of ARQ re-transmissions exceed a configurable value.

On layer 3 (L3): No NW response on UL signaling. For example, if a UE fails in its attempts to receive any response to its random access attempts in LTE, the UE may need to take appropriate actions to recover from the deadlock.

In some further detail, it is noted that in E-UTRAN/LTE there are following ways for a UE to autonomously detect that contact with an E-UTRAN cell has been lost.

The estimated quality the PDCCH is below a threshold over a NW configurable time.

The received cell specific reference symbols are below a threshold over a NW configurable time.

Maximum number of RLC retransmissions has been used for RLC AM bearer.

No response from NW on UE UL control signaling e.g. scheduling request without response and Random access without response.

The additional ways for eNB to detect Radio Link Failure (RLF) conditions are e.g.:

On Layer 1 (L1): Quality on mandatory/expected transmission from UE is too bad for too long time.

On L1/L2/L3: No response from UE on NW control signaling e.g. time alignment commands and forced Random Access (RA). By "forced Random Access", it is denoted the procedure where the network asks the UE to perform a RA to the network, such that e.g. time-alignment can be established, in case the time-alignment has been lost. In these cases, the network asks the UE to perform a transmission in the UL, but since the network receives no response, it may deduce that there is a problem with the UL and/or DL connection with that UE.

As a consequence of this RL monitoring, the UE may deduce that a Radio Link has failed. As can be seen above, the UE takes various actions when certain criteria related to a radio link (RL) are fulfilled. However, present art lacks any support and understanding of how a UE should behave in case the UE is connected to the network by the help of radio links implementing different radio access technologies. The present invention provides solutions to this problem, such that efficient radio-link monitoring can be achieved in such a scenario.

An object of the invention is to overcome or at least alleviate one or more of the mentioned problems.

The object is, according to a first aspect of the invention, achieved by a method in a user equipment for radio-link monitoring in a communication network. The user equipment receives and/or transmits data on a first carrier using a primary radio access technology system and on a second carrier using a secondary radio access technology system. The method comprises: receiving, from a network node, information about the primary radio access technology system and the secondary radio access technology system; and determining, in dependence on information related to the primary radio access technology system and the secondary radio access technology system, whether to monitor radio link criteria on: the first carrier on the primary radio access technology system, or both the first carrier on the primary radio access technology system and the second carrier on the secondary radio access technology system.

By means of the invention, methods and devices are provided that enable radio link monitoring when two or more different radio access technology systems are used.

The object is, according to a second aspect of the invention, achieved by a user equipment of a communication network. The user equipment is configured to receive and/or transmit data on a first carrier using a primary radio access technology system and a on a second carrier using a secondary radio access technology system. The user equipment is further configured to: receive, from a network node, information related to the first radio access technology system and the second radio access technology system; and determine, in dependence on information related to primary radio access technology system and secondary radio access technology system, whether to monitor radio link criteria on: the first carrier on the primary radio access technology system, or both the first carrier on the primary radio access technology system and the second carrier on the secondary radio access technology system.

Further features and advantages of the invention will become clear upon reading the following description and the accompanying drawings.

DETAILED DESCRIPTION OF EMBODIMENTS

Figure 1:
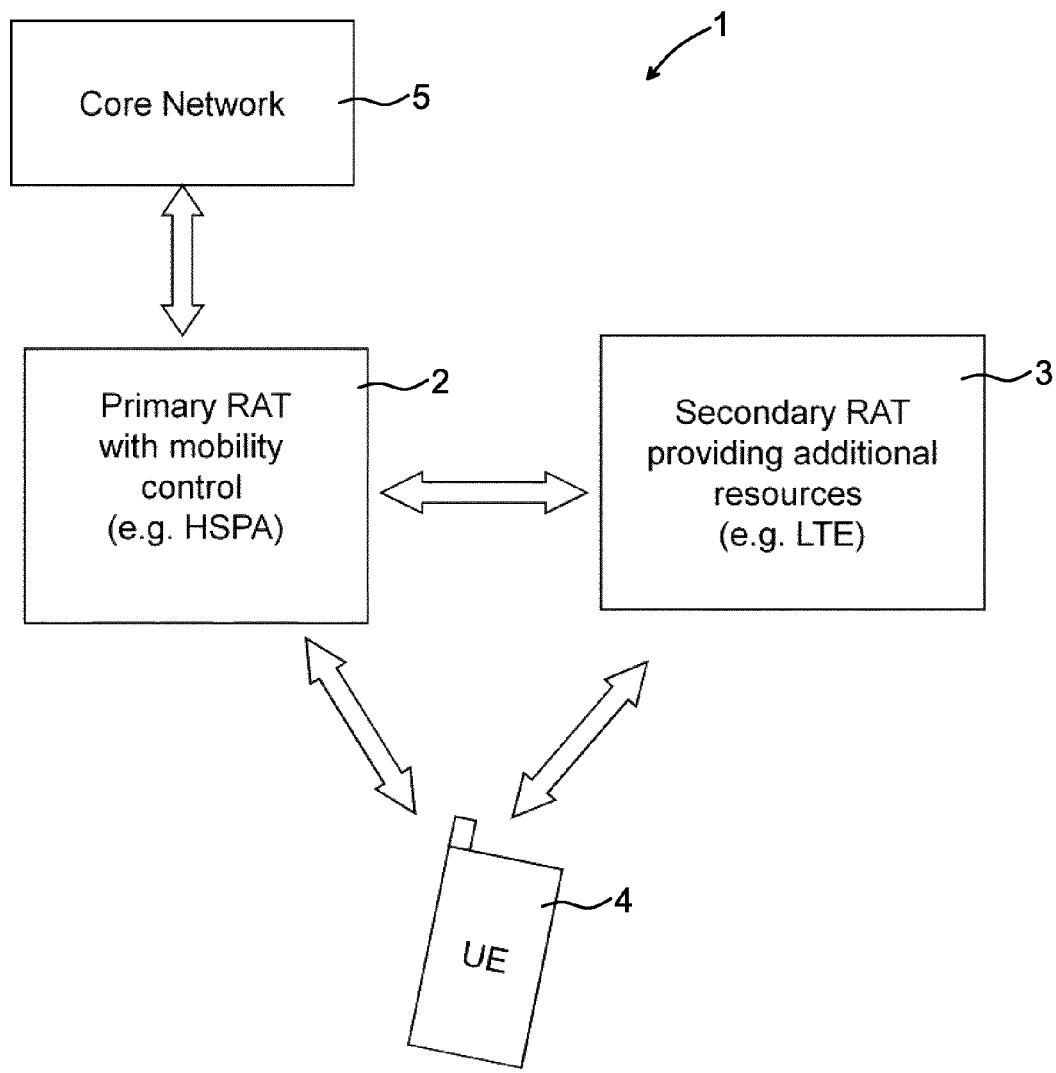
FIG. 1 exemplifies aggregation with a primary system and secondary system.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In the present description, primary focus is on the HSPA-evolution built on the WCDMA radio access also called UTRAN (UMTS Terrestrial Radio Access Network), and LTE, which is based on OFDM (Orthogonal Frequency Division Multiplexing) and SC-FDMA (Single-Carrier Frequency Division Multiple Access), also recognized as the Long Term Evolution of UTRAN, or E-UTRAN. Detailed UTRAN radio access specifications are described in the 25-series of 3GPP specifications, while E-UTRAN specifications are found in the 36-series. LTE was introduced in 3GPP Release 8, but the development and future evolution of both HSPA and LTE continues in parallel in Release 9, 10 and so on. It should be understood, however, that the present invention is not limited to these exemplary technologies, but the invention is equally applicable to any combination of accesses, as will be further explained below.

Carrier aggregation (CA), wherein a combination or aggregation of two independent carriers is made, is one way of achieving increased resource utilization and spectrum efficiency. For example, in LTE+HSPA carrier aggregation each carrier is an LTE carrier or a HSPA carrier. For such LTE+HS carrier aggregation one possibility is that a mobile terminal or wireless device or user equipment (UE) is in connection to a primary serving cell on a primary/first RAT (for instance HSPA) on a first carrier and a secondary/second serving cell on a second/secondary RAT (for instance LTE) on a second carrier, i.e. in a similar way as primary and secondary cell are defined on intra RAT (such as each of LTE or HSPA) carrier aggregation. It is possible that one of the RATS and systems is considered as being the one in control of the UE, while the carrier or carriers on the other system (or RAT) is considered as a performance "booster", in the sense that such "secondary" carriers are added to enhance the performance. For example, UTRAN/HSPA could be the primary system/RAT, while E-UTRAN/LTE may be the secondary system/RAT. In a possible configuration situation, it could happen e.g. that a UE is first connected to UTRAN/HSPA, and then later, the UE is configured to add carriers on LTE. LTE is then a secondary RAT, i.e. the connection control remains in UTRAN/HSPA, even if some LTE carriers or cells are added to "boost" the performance. Of course, it is also possible that E-UTRAN/LTE acts as the primary system, and UTRAN/HSPA is the secondary system.

In FIG. 1, for the sake of illustration, the above scenario is outlined, i.e. wherein HSPA is acting as the primary system and RAT 2 and LTE is the secondary system and RAT 3. In such a situation, it is possible that e.g. mobility is controlled by the primary system and RAT. Various possible future scenarios apply, and should not be seen as limiting the applicability of different aspect of the present invention. A communication system 1 or communication network thus comprises the primary radio access technology system 2 and the secondary radio access technology system 3. Further, a user equipment 4 or wireless device receives on at least one downlink carrier on the first radio access technology system 2 and on at least one downlink on the second radio access technology system 3. In the FIG. 1, the communication system 1 is illustrated to comprise also a core network 5, associated with the primary RAT 2.

While the present invention will mainly be described under an assumption that a UE is configured to receive information on one downlink carrier and possibly send/transmit on one uplink carrier using a first radio access technology and the UE is configured to receive information on one downlink carrier and possibly send/transmit on one uplink carrier using a second radio access technology, it should be understood that there may be multiple such carriers/links using both technologies. Constraining the description to one carrier on each system/RAT, and in downlink and uplink, respectively, is just to retain clarity and simplicity in the description of the main embodiments of the invention.

It should also be noted that the use of terminology should not limit the applicability of the present invention. For example, the use of the terms "cell" or "carrier" is many times interchangeable, as described earlier. While LTE uses the term Carrier Aggregation, HSPA is typically using the term multi-cell operation, as also described earlier. In both cases, it is about receiving and/or sending on multiple carriers/cells at the same time.

The present invention provides the means and logic for implementing radio link monitoring techniques when two different mechanisms and technologies are combined.

Information about the primary and secondary RATs is received from the network node. That is, the network configures a UE to receive and/or send/transmit on multiple carriers, where at least a first and a second carrier are implemented using different radio access technologies. "Implementing" means that the UE can receive and/or send/transmit on the aforementioned carriers using methods and protocols defined by different technologies, such as WCDMA/HSPA and LTE. The network may configure a UE to receive using two technologies and only transmit using one technology. Alternatively, the UE may be configured to transmit and receive using both technologies on multiple carriers. Similarly, the network node, such as a Radio Base Station (RBS) or RBSes, in control of the relevant carriers may be configured i.e. prepared to receive and send the corresponding signals in order to facilitate the communication with the UE.

Based on the primary and secondary RAT used by the UE and network (RBS), and according to the present invention, the UE determines whether to monitor the radio link criteria on the primary RAT only, or if the terminal shall monitor radio link criteria on both the primary and secondary RAT.

The criteria for monitoring the radio link quality, i.e. a metric, such as SIR/BLER (Signal-to-Interference ratio/Block Error Rate) etc., to monitor is based on the RAT in question, and the UE action upon a detection of a radio link failure (RLF) on a certain RAT and carrier is based on whether the corresponding carrier is (i.e. is implemented using) a primary or secondary RAT.

In addition, the criteria for both monitoring the radio link quality and the actions taken depend on the RAT on which the monitoring and problem detection is performed.

In yet another solution in conformance with this invention, the detection of RLF, and actions following the detection, is dependent on whether there is an uplink corresponding to the DL upon which the monitoring is performed.

As mentioned above, the invention also covers RLF actions following the detection according to the invention, in the case where multiple carriers on primary and/or secondary RAT are used.

Figure 2:
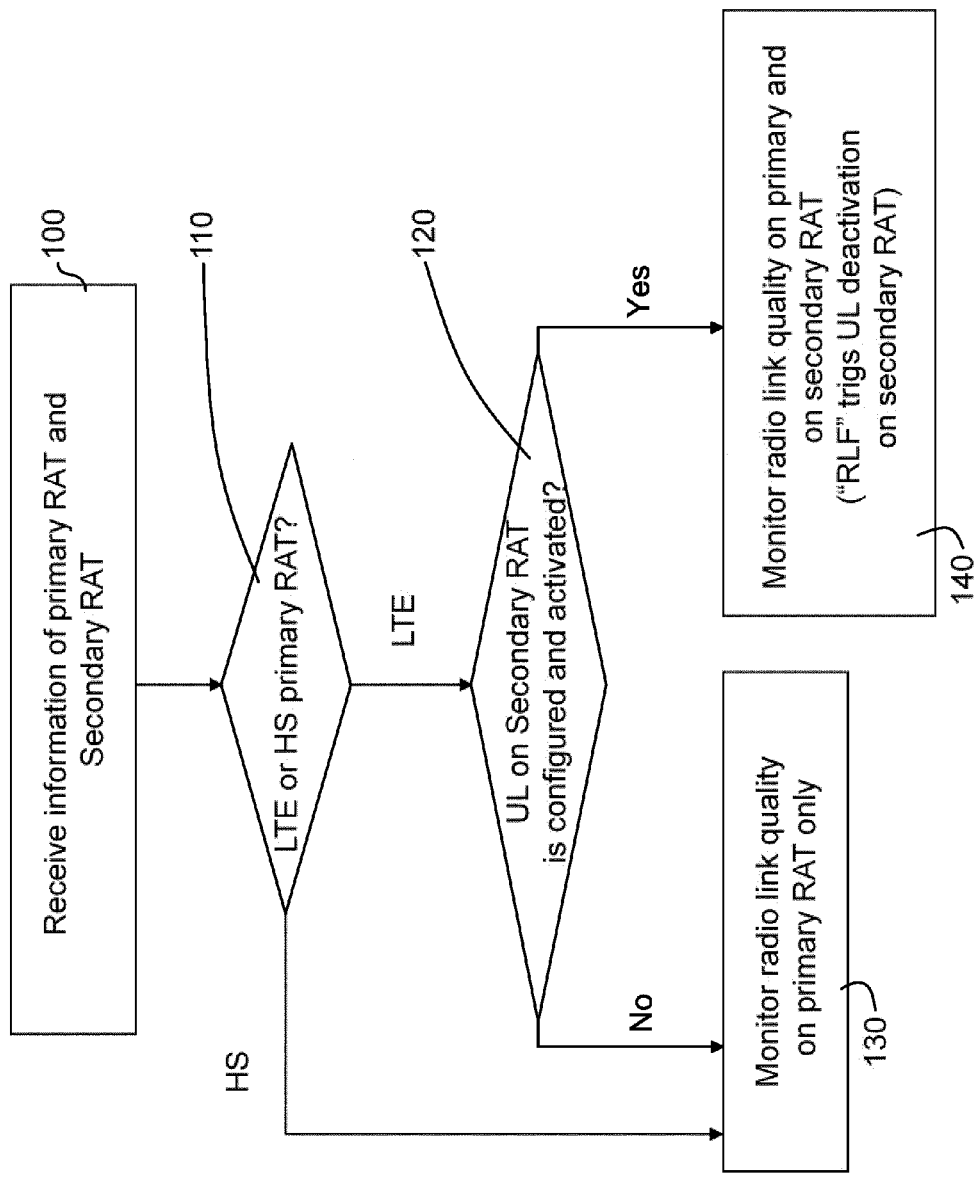
FIG. 2 is a flow chart of methods implemented in a user equipment.

FIG. 2 shows a flow chart of embodiments of the invention. The UE 4 receives information about primary and secondary RAT from the network (step 100). In accordance with an embodiment of the present invention, the information about which RAT is the primary and which is the secondary one is provided to the UE using higher-layer signaling, e.g. using RRC protocol signaling, as described in 3GPP TS 25.331 (for WCDMA/HSPA) and 3GPP TS 36.331 (for LTE). It is possible that only one RRC protocol would be used, in which case it is likely that the protocol of the RAT that is the primary one would be used. That is, if LTE is the primary system and RAT, then the RRC protocol specified in TS 36.331 would be enhanced to support the necessary signaling needed for HSPA+LTE carrier aggregation according to the present invention. Alternatively, if WCDMA/HSPA would be the primary system and RAT, then 3GPP TS 25.331 could be enhanced with procedures and parameters that are needed for the embodiments of the present invention.

In addition, and according to embodiments of the present invention, the UE 4 receives, also via RRC signaling, information about the number of configured/activated carriers on respective RAT that is used (step 110). In case e.g. the HSPA is the primary RAT (branch HS from block 110), all configured and UL activated primary and secondary servings cells on the primary RAT are subject to radio link quality monitoring, i.e. the UE implements procedures for detection of an RLF (step 130) on each radio link in the forward direction (i.e. DL) that has an associated link in the reverse direction (i.e. UL). This monitoring may be implemented according to prior-art methods as specified e.g. in 3GPP TS 25.331.

With reference to step 130, the UE would then not need to perform any radio link monitoring on the carriers that the UE is using on the secondary RAT, i.e. LTE in this example.

In an alternative embodiment (not illustrated in FIG. 2), the UE could still perform radio link monitoring on the secondary RAT (LTE in this example), but the UE would not undertake any autonomous actions except for reporting the detection of a bad link using a signal from the UE to the network node, in case the monitoring fulfills some specific criteria. The criteria for sending this message could be configurable by the network, i.e. the network node informs when the UE should report to the network about the failing LTE link. In such an embodiment, the UE would monitor the radio link quality on the secondary cells/carriers in LTE, where LTE is the secondary RAT/system, and the UE would send a message to the network that one or several of the LTE cells/carriers are not fulfilling a quality threshold of the signal strengths, i.e. the link or links are failing.

If on the other hand, LTE is the primary RAT (LTE branch out from block 110), the UE also determines the number of configured and activated secondary UL cells/carriers on the secondary RAT, which is HSPA in this example (step 120). In case there is no configured and no active HSPA UL carriers (path indicated by no from box 120), only the primary serving cell on the primary RAT (LTE) is monitored for RLF (step 130). In case there are configured and active HSPA UL carriers (path indicated by "yes" from box 120), then also the associated DL carriers for the secondary RAT are monitored for RLF (step 140). Hence, radio link quality is monitored by the UE on the carriers of both the primary and secondary RAT.

The monitoring of the radio link quality in step 140 may be performed using methods known from the art, e.g. according to 3GPP TS 25.331.

Figure 3:
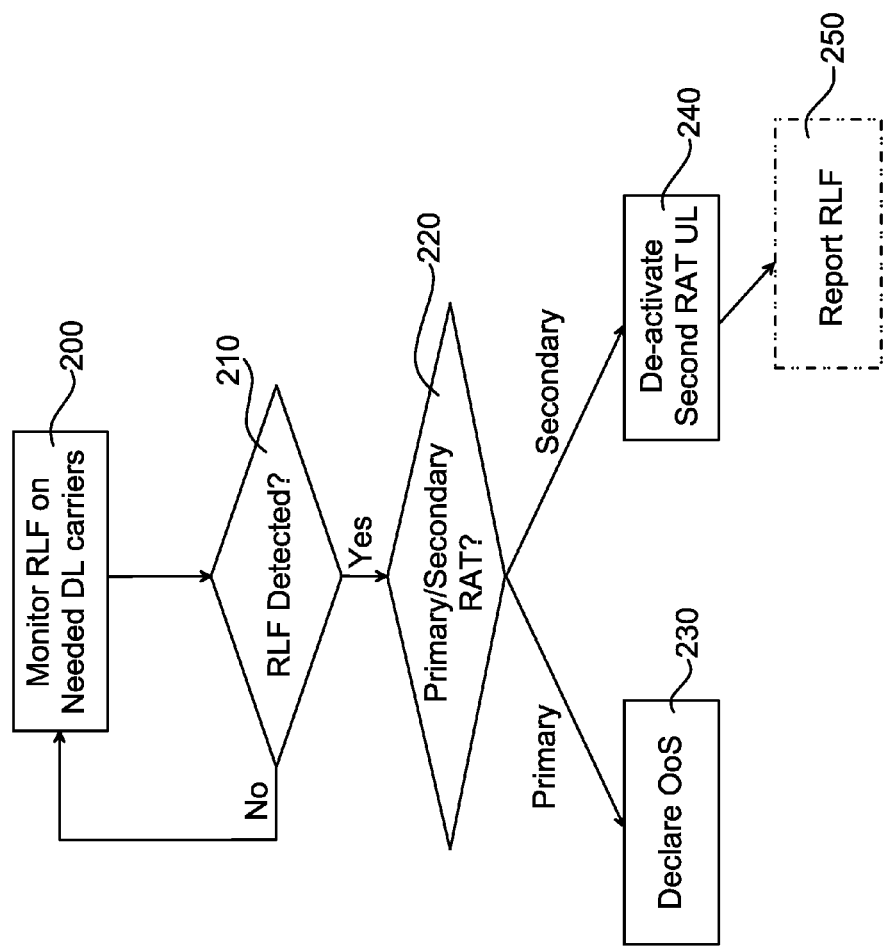
FIG. 3 is another flow chart of methods implemented in a user equipment.

FIG. 3 shows a flow chart of the UE radio link quality monitoring procedure for RLF detection according to embodiments of the invention. In step 200, the UE monitors for an RLF on DL carriers, as described above in relation to FIG. 2, where the carriers/cells upon which this monitoring is applied follows the logic already presented.

In a non-exclusive example, the UE may for example monitor for RLF detection in two cells, where one of the cells is using (i.e. configured to use) the primary RAT, and the second cell is using the secondary RAT. The UE is thus configured with a primary serving cell in the primary RAT a primary serving cell in the secondary RAT. In this case, there are no secondary cells according to this nomenclature, since the UE is configured to receive information on only two carriers/cells—one in each RAT.

The RLF metric to monitor is dependent on the RAT, as specified by 3GPP. Various metrics could be used. For example, one might use the metrics that are already existing and specified for WCDMA/HSPA, that the UE monitors SIR (Signal-to-Interference Ratio) on the DPCCH (Dedicated Physical Data Channel) pilots as well as BLER (Block Error Rate) on DPDCH (in case A-DPCH (Associated-DPCH) is used and DPDCH exists), or SIR on the TPC bit on the F-DPCH (Fractional-DPCH). Other examples of metrics comprise those used in LTE, wherein a hypothetical BLER on the PDCCH is monitored, which may be the BLER based on SIR determined from common reference signals (CRS). These metrics are only examples, and should not be considered as limiting. Other metrics for monitoring link problems could also be used.

Upon RLF detection (yes path from block 210) on a certain DL carrier, where the RLF may be detected for example if SIR is below a threshold, or BLER is above a threshold (refer to the examples in the previous paragraph), a control unit in the UE determines what type of cell the RLF was detected for.

Returning to the previous non-exclusive example with two cells, if the RLF was detected for the cell of the primary RAT, then an out-of synch may be declared, as will be further described below. On the other hand, if the RLF was detected for the cell of the secondary RAT, it is possible that the UE deduces that service can still be maintained via the primary RAT, and some limited actions, such as sending a report to the network or disabling uplink transmissions in the secondary RAT may occur, i.e. disabling or preventing any transmissions on an uplink carrier associated with the failed secondary RAT downlink, as will be further described in conjunction with FIG. 3 and step 240.

As noted earlier, the metric on how to detect the RLF may be dependent on the RAT configured on the certain DL. The determination what type of cell the RLF was detected for may comprise a determination if the RLF is detected for a cell/carrier using a primary RAT or a cell/carrier using a secondary RAT. In addition, the determination may comprise a determination if the RLF is detected for a cell/carrier using a secondary RAT (step 220).

In case the cell/carrier is using the primary RAT, an Out-of-Sync is declared (step 230), and appropriate action or actions are taken, depending on the concerned RAT. That is, upon declaration of out-of-synch, the UE may take various actions to resolve the loss of synchronization with the network over the primary RAT. As noted before, the loss of synchronization may require various actions, depending on what functionality is dependent on maintenance of synchronization.

The actions to take are dependent on various factors, such as whether the cell/carrier or for which RLF was detected is using the primary or secondary RAT (step 220), whether the cell is a primary or secondary cell, and/or whether there is any uplink carrier associated with the downlink carrier for which the radio link failure was detected.

In the earlier two-cell example, if the failure was detected for the primary RAT, it may happen that a procedure that attempts to recover the connection is needed, such as a connection re-establishment procedure. Other actions, such as disabling any transmission on a corresponding uplink may also be needed. On the other hand, if the failure was detected on the secondary RAT, it is possible that only limited actions are taken. If the secondary RAT is WCDMA/HSPA, a fast disabling of any uplink transmissions on the uplink WCDMA/HSPA carrier may be needed, possibly followed by a report to be sent to the network over the primary RAT, which in this example then could be using LTE. The report then indicates, among other things, that the connectivity over the secondary RAT is suffering from the aforementioned detected problems.

As already noted, and in more general terms, when a radio link quality on a carrier deteriorates, some actions already known from prior art may be applied. For instance, when the failed link is using HSPA, the UE disables the transmission, and Layer 3 (L3) timers are started. If the conditions prevail until the timer or timers elapse, additional actions, such as a cell re-selection, may be needed in some cases. When the failed link is using LTE, a similar procedure with L3 timers is done.

Reverting to box 220, if the secondary RAT triggered the RLF (and for example HSPA is the secondary RAT), the UE deactivates the UL transmission on the UL carrier associated with the DL carrier triggering RLF (step 240). In an optional step the RLF on the secondary RAT is reported to the network, using, for example transmission on the primary RAT (step 250).

The description above is mainly focusing on the case with a single downlink carrier for the primary and secondary RAT, but the invention is not limited to that case. When multiple downlink carriers are configured for the primary RAT, and the primary RAT is HSPA, then RLF monitoring is made on all DL HSPA carriers which has an associated and activated UL carrier. Out-of-sync declaration is only made based on RLF on the primary cell/carrier. In case RLF is detected on other (secondary) cells/carriers on the primary RAT, deactivation of the associated UL carrier is made. For secondary cells on the secondary RAT (LTE), the UE does not need to monitor RLF for deactivation/RLF purpose, but can as described above be made for other circumstances, and be reported to the network once some certain event has been triggered.

If, for example, LTE is the primary RAT, RLF detection is only made on the primary serving cell for LTE. For the secondary RAT (e.g. HSPA), the UE needs to monitor and perform detection for RLF on DL:s that has an associated and configured UL carrier. Upon RLF detection, the UE should deactivate any transmission on the associated uplink carriers. A reporting mechanism may be implemented for reporting to the network node about RLF on these secondary carriers on the secondary RAT once certain events are triggered.

Figure 4:
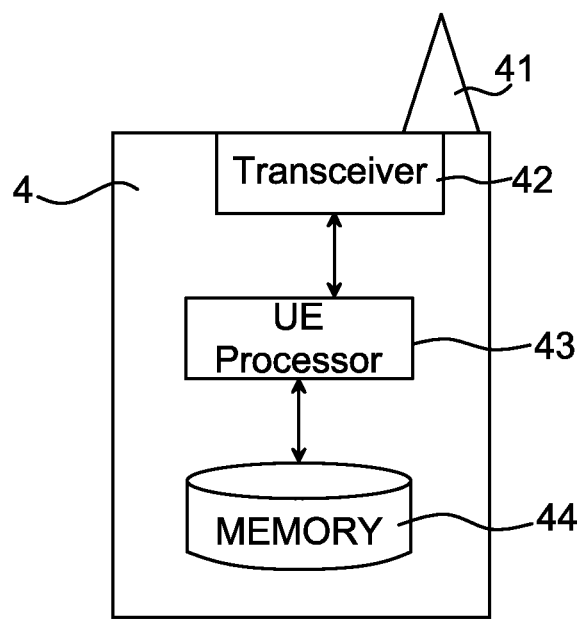
FIG. 4 illustrates schematically a user equipment for implementing embodiments of the methods.

FIG. 4 illustrates schematically a user equipment 4 for implementing embodiments of the methods as described. As shown in FIG. 4, the schematically illustrated UE 4 comprises processing circuitry or a processor 43, a memory 44, a transceiver 42, and an antenna 41. In particular embodiments, some or all of the functionality may be provided by the UE processor 43 executing instructions stored on a computer readable medium, such as the memory 44 shown in FIG. 4. Alternative embodiments of the UE 4 may include additional components beyond those illustrated in FIG. 4 that may be responsible for providing certain aspects of the UE's functionality, including any functionality necessary to support the solution described above. For example, application specific integrated circuitry could be used for implementing certain steps or aspects of the embodiments of the method as described. Further, combinations of software and hardware may be used to implement, in the UE, embodiments of the method as described.

In the following, various embodiments of the invention are described. A method may be implemented in a user equipment for radio-link monitoring in a communication network. The user equipment receives and/or transmits data on a first carrier using a primary radio access technology system and on a second carrier using a secondary radio access technology system. The method comprises: receiving, from a network node, information about the primary radio access technology system and the secondary radio access technology system; and determining, in dependence on information related to the primary radio access technology system and the secondary radio access technology system, whether to monitor radio link criteria on: the first carrier on the primary radio access technology system, or both the first carrier on the primary radio access technology system and the second carrier on the secondary radio access technology system.

By means of the invention, methods and devices are provided that enable radio link monitoring when two or more different radio access technology systems are used.

In an embodiment, the method comprises reporting, to the network node, using the primary radio access technology system, a detected radio link failure for the primary serving cell on the secondary radio access technology system. This feature enables the user equipment to report, to the network, about a radio link of a radio access technology for which there is no uplink carrier configured.

In an embodiment, the information about the first access technology system and the second radio access technology system comprises information about which radio access technologies is a primary and secondary radio access technology, respectively, and/or information about a number of configured/activated carriers used on the respective radio access technology system.

In a variation of the above embodiment, the information is received by means of radio resource control signaling.

In an embodiment, the primary radio access technology system conforms to a high-speed packet access technology, and the method comprises: receiving, from the network node, information about the number of configured carriers used on respective radio access technology system; and monitoring, only on the primary radio access technology system, radio link criteria on each radio link in the downlink having an associated link in the uplink.

By "associated uplink", it is here meant that the UL and DL carriers may be configured in pairs, and that some relevant control information of the UL is carried on a corresponding DL, and possibly vice versa. For example, such control information may comprise the aforementioned TPC commands carried on a channel configured on a DL carrier, where the TPC commands are needed to control the transmission power of the associated uplink carrier. Thus, and if the UE is configured with a downlink having an associated uplink, it will be configured to send and receive on channels on those carriers. As described before, there is then a necessity to monitor radio-link quality on the configured downlink, such that the reliability of the TPC commands related to the associated uplink are received reliably.

In an embodiment, the method comprises monitoring specified radio link failure metric or metrics based on type of primary radio access technology system and type of secondary radio access technology system.

In an embodiment, the method comprises: detecting a radio link failure; determining the radio link failure to be for a primary serving cell on the primary radio access technology system; and declaring out-of-synchronization. "Declaring the loss of synchronization" implies that the UE now finds that radio-link in question is unreliable, and the UE may need to take appropriate actions since various functions in the UE may be dependent on the maintenance of synchronization and link reliability of this particular link. As described above, such functionality may comprise time-alignment and power control.

In another embodiment, the method comprises: detecting a radio link failure, determining the radio link failure to be for the primary serving cell or another serving cell on the secondary radio access technology system; and deactivating an uplink transmission for the uplink carrier associated with the downlink carrier for which the radio link failure was detected.

In an embodiment, the primary radio access technology system conforms to Long Term Evolution standards, and the radio link quality monitoring comprises monitoring radio link failure only on a primary serving cell of the primary radio access technology system.

In a variation of the above embodiment, the secondary radio access technology system conforms to a high-speed packet access technology, and the method comprises monitoring, for the secondary radio access technology system, radio link failure on downlink carriers, for downlink carriers, on which the user equipment receives control information related to an associated uplink.

That is, the UE is configured to receive control information on the downlink carrier, and the control information comprises information related to an associated UL carrier. The UE is configured to transmit on a channel or channels carried on the associated UL carrier, and to obey the received control information, i.e. to do as instructed.

In another aspect, a user equipment may be provided for use in a communication network. The user equipment is configured to receive and/or transmit data on a first carrier using a primary radio access technology system and a on a second carrier using a secondary radio access technology system. The user equipment is further configured to: receive, from a network node, information related to the first radio access technology system and the second radio access technology system; and determine, in dependence on information related to primary radio access technology system and secondary radio access technology system, whether to monitor radio link criteria on: the first carrier on the primary radio access technology system, or both the first carrier on the primary radio access technology system and the second carrier on the secondary radio access technology system.

In an embodiment, the user equipment is further configured to report, to the network node, a detected radio link failure for the primary serving cell on the secondary radio access technology system. The user equipment is configured to send the report on a channel carried on a carrier related to the primary radio access technology system. In an embodiment, the information about the first access technology system and the second radio access technology system comprises information about which radio access technologies is a primary and secondary radio access technology, respectively, and/or information about number of configured/activated carriers used on the respective radio access technology system.

In an embodiment, the primary radio access technology system conforms to a high-speed packet access technology, and the user equipment is configured to: receive, from the network node, information about the number of configured carriers used on respective radio access technology system; and monitor, only on the primary radio access technology system, radio link criteria on each radio link in the downlink carrier having an associated link in the uplink.

In an embodiment, the user equipment is configured to: monitor specified radio link failure metric or metrics based on type of primary radio access technology system and type of secondary radio access technology system.

In an embodiment, the user equipment is configured to: detect a radio link failure; determine the radio link failure to be for a primary serving cell on the primary radio access technology system; and declare out-of-synchronization.

In an embodiment, the user equipment is configured to: detect a radio link failure; determine the radio link failure to be for the primary serving cell or another serving cell on the secondary radio access technology system; and deactivate an uplink transmission for the uplink carrier associated with the downlink carrier for which the radio link failure was detected.

In an embodiment, the primary radio access technology system conforms to Long Term Evolution standards, and the user equipment is configured to monitor radio link failure only on a primary serving cell of the primary radio access technology system.

In an embodiment, the secondary radio access technology system conforms to a high-speed packet access technology, the user equipment is configured to monitor, for the secondary radio access technology system, radio link failure for downlink carriers, on which the user equipment is configured to receive control information related to an associated uplink.

The invention claimed is:

1. A method for radio-link monitoring in a user equipment (UE) of a communication network, comprising:
communicating, by a UE, on a first carrier using a primary radio access technology (RAT) system;
communicating, by the UE, on a second carrier using a secondary RAT system;
receiving, from a network node, information related to the primary RAT system and the secondary RAT system;
monitoring, using the primary RAT, radio link criteria on the first carrier; and
determining, based on information related to the primary RAT system and the secondary RAT system, whether to monitor radio link criteria on the second carrier using the secondary RAT;
detecting a radio link failure;
determining the radio link failure to be for a primary serving cell or a serving cell on the secondary RAT system; and
deactivating an uplink transmission for an uplink carrier associated with a downlink carrier for which the radio link failure was detected;
wherein the primary RAT system and the secondary RAT system comprise different RATs.

2. The method of claim 1, further comprising reporting, to the network node, a detected radio link failure for a primary serving cell on the secondary RAT system, using the primary RAT system.

3. The method of claim 1, wherein the information related to the primary RAT system and the secondary RAT system comprises at least one of:
information about which RAT system is the primary RAT system and which RAT system is the secondary RAT system;
information about a number of configured carriers used on each respective RAT system.

4. The method of claim 3, wherein the information related to the primary RAT system and the secondary RAT system is received by radio resource control signaling.

5. The method of claim 1, further comprising monitoring a specified radio link failure metric based on a type of the primary RAT system and a type of the secondary RAT system.

6. The method of claim 1:
wherein the primary RAT system conforms to Long Term Evolution standards; and
wherein the radio link criteria on the first carrier comprises radio link failure only for a primary serving cell of the primary RAT system.

7. The method of claim 6, further comprising:
wherein the secondary RAT system conforms to a high-speed packet access technology;
monitoring, using the secondary RAT system, radio link failure for the second carrier and a downlink third carrier;

receiving, via the second carrier and the downlink third carrier, control information related to an uplink associated with the second carrier and the downlink third carrier.

8. A method for radio-link monitoring in a user equipment (UE) of a communication network, comprising:
communicating, by a UE, on a first carrier using a primary radio access technology (RAT) system conforming to a high-speed packet access technology;
communicating, by the UE, on a second carrier using a secondary RAT system that comprises a different RAT than the primary RAT system;
receiving, from a network node, information related to the primary RAT system and the secondary RAT system;
monitoring, using the primary RAT system, radio link criteria on the first carrier;
determining, based on the information related to the primary RAT system and the secondary RAT system, not to monitor radio link criteria on the second carrier using the secondary RAT;
determining a number of configured uplink and downlink carriers used on each respective RAT system from the information related to the primary RAT system and the secondary RAT system;
monitoring, only on the primary RAT system, radio link criteria for each radio link in a configured downlink carrier that has an associated link in a configured uplink carrier.

9. The method of claim 8, further comprising:
detecting a radio link failure;
determining the radio link failure to be for a primary serving cell on the primary RAT system; and
resynchronizing the radio link on which the failure was detected.

10. The method of claim 8, wherein the information related to the primary RAT system and the secondary RAT system comprises at least one of:
information about which RAT system is the primary RAT system and which RAT system is the secondary RAT system;
the number of configured carriers used on each respective RAT system.

11. A user equipment (UE) of a communication network, the UE comprising:
an antenna;
a transceiver operatively connected to the antenna;
processing circuitry operatively connected to the transceiver and configured to cause the UE to:
communicate on a first carrier using a primary radio access technology (RAT) system;
communicate on a second carrier using a secondary RAT system;
receive, from a network node, information related to the primary RAT system and the secondary RAT system;
monitor, using the primary RAT system, radio link criteria on the first carrier;
determine, based on information related to the primary RAT system and the secondary RAT system, whether to monitor radio link criteria on the second carrier using the secondary RAT system;
detect a radio link failure;
determine the radio link failure to be for a primary serving cell or a serving cell on the secondary RAT system; and
deactivate an uplink transmission for an uplink carrier associated with a downlink carrier for which the radio link failure was detected;
wherein the primary RAT system and the secondary RAT system comprise different RATs.

12. The UE of claim 11, wherein the processing circuitry is further configured to cause the UE to report, to the network node, a detected radio link failure for a primary serving cell on the secondary RAT system, using a channel carried on a carrier related to the primary RAT system.

13. The UE of claim 11, wherein the information related to the primary RAT system and the secondary RAT system comprises at least one of:
information about which RAT system is the primary RAT system and which RAT system is the secondary RAT system;
information about a number of configured carriers used on the respective RAT system.

14. The UE of claim 11, wherein the processing circuitry is further configured to cause the UE to monitor a specified radio link failure metric based on type of the primary RAT system and a type of the secondary RAT system.

15. The UE of claim 11:
wherein the primary RAT system conforms to Long Term Evolution standards; and
wherein the radio link criteria on the first carrier comprises radio link failure only for a primary serving cell of the primary RAT system.

16. The UE of claim 15, wherein the processing circuitry is further configured to cause the UE to:
wherein the secondary RAT system conforms to a high-speed packet access technology;
monitor, using the secondary RAT system, radio link failure for the second carrier and a downlink third carrier;
receive, via the second carrier and the downlink third carrier, control information related to an uplink associated with the second carrier and the downlink third carrier.

17. A user equipment (UE) of a communication network, the UE comprising:
an antenna;
a transceiver operatively connected to the antenna;
processing circuitry operatively connected to the transceiver and configured to cause the UE to:
communicate on a first carrier using a primary radio access technology (RAT) system that conforms to a high-speed packet access technology;
communicate on a second carrier using a secondary RAT system that comprises a different RAT than the primary RAT system;
receive, from a network node, information related to the primary RAT system and the secondary RAT system;
monitor, using the primary RAT system, radio link criteria on the first carrier;
determine, based on information related to the primary RAT system and the secondary RAT system, not to monitor radio link criteria on the second carrier using the secondary RAT system;
determine a number of configured uplink and downlink carriers used on each respective RAT system from the information related to the primary RAT system and the secondary RAT system;
monitor, only on the primary RAT system, radio link criteria for each radio link in a configured downlink carrier having an associated link in a configured uplink carrier.

18. The UE of claim 17, wherein the processing circuitry is further configured to cause the UE to:
detect a radio link failure;
determine the radio link failure to be for a primary serving cell on the primary RAT system; and resynchronize the radio link on which the failure was detected.

19. The UE of claim 17, wherein the information related to the primary RAT system and the secondary RAT system comprises at least one of:
- information about which RAT system is the primary RAT system and which RAT system is the secondary RAT system;
- the number of configured carriers used on the respective RAT system.

* * * * *

UNITED STATES PATENT AND TRADEMARK OFFICE
CERTIFICATE OF CORRECTION

PATENT NO. : 9,232,418 B2
APPLICATION NO. : 14/110307
DATED : January 5, 2016
INVENTOR(S) : Lindoff et al.

It is certified that error appears in the above-identified patent and that said Letters Patent is hereby corrected as shown below:

Title Page

On Page 2, in Item (56), under "OTHER PUBLICATIONS", in Column 2, Line 1, delete "Coporation, et al., "Radio Ling" and insert -- Corporation, et al., "Radio Link --, therefor.

Specifications

In Column 7, Line 27, delete "RATS" and insert -- RATs --, therefor.

In Column 9, Line 39, delete "no" and insert -- "no" --, therefor.

In Column 10, Line 1, delete "DPCCH" and insert -- DPDCH --, therefor.

Signed and Sealed this
Twelfth Day of April, 2016

Michelle K. Lee
*Director of the United States Patent and Trademark Office*